US008042246B1

(12) United States Patent
Ureneck

(10) Patent No.: US 8,042,246 B1
(45) Date of Patent: Oct. 25, 2011

(54) TOOL AND METHOD OF REPAIR FOR REMOVING BULGES IN STAINED GLASS WINDOWS

(76) Inventor: Peter B. Ureneck, Dorchester, MA (US)

( * ) Notice: Subject to any disclaimer, the term of this patent is extended or adjusted under 35 U.S.C. 154(b) by 820 days.

(21) Appl. No.: 12/154,607

(22) Filed: May 27, 2008

(51) Int. Cl.
*B23P 6/00* (2006.01)

(52) U.S. Cl. ............... 29/402.01; 29/402.04; 29/402.06; 29/402.08; 29/402.18; 269/3; 269/6; 269/95; 269/166; 425/11; 425/12; 425/13; 411/81

(58) Field of Classification Search ............... 29/402.01, 29/402.04, 402.05, 402.06, 402.08, 402.14, 29/402.18; 269/3, 6, 95, 166, 136, 138; 425/11, 425/12, 13; 411/81
See application file for complete search history.

(56) References Cited

U.S. PATENT DOCUMENTS 1,428,955 A * 9/1922 Grossman ..................... 411/368
2,991,213 A * 7/1961 Williams ................... 156/304.3
4,225,298 A * 9/1980 Henderson ...................... 425/11
4,252,847 A * 2/1981 DelGrande ..................... 428/38
5,954,901 A * 9/1999 Henderson ...................... 156/94

* cited by examiner

*Primary Examiner* — Derris Banks
*Assistant Examiner* — Azm Parvez
(74) *Attorney, Agent, or Firm* — William Nitkin

(57) ABSTRACT

A tool and method of repair for removing a bulge in a stained glass window by providing at least one aperture in the metal earning of the stained glass window; positioning at least one threaded rod member through at least one of such aperture(s); further positioning two tool members one on each side of the stained glass window, each tool member having at least one aperture defined therein and a flat surface with the flat surface of one tool member being positioned against the bulge in the stained glass window and the other positioned behind the bulge, each of such tool members receiving such rod member (s), respectively, in such tool member aperture(s). Tightening means are positioned on the ends of such rod member(s) which tightening means are manually adjusted to urge such tool members toward one another to compress the bulge in the stained glass window to bring it into alignment with the original plane of the stained glass window while the stained glass window is within its frame including when the window is still in a wall or other location without the need for disassembling and reassembling the stained glass pieces.

5 Claims, 5 Drawing Sheets

TOOL AND METHOD OF REPAIR FOR REMOVING BULGES IN STAINED GLASS WINDOWS

BACKGROUND OF THE INVENTION

1. Field of the Invention

The tool and method of repair of this invention resides in the field of stained glass windows and more particularly relates to a tool and method of repair for removal of a bulge in a stained glass window while the window is within its frame including when the window is still in place in a wall or other location without the need for disassembling and reassembling the stained glass pieces.

2. History of the Prior Art

Leaded stained glass windows are well known in art, dating back a significant period of time. Such windows were extremely popular in the late nineteenth century. Over time these stained glass windows have developed various problems, not the least of which is bulging or bowing of some of the glass pieces out of the plane of the original window. This bulging or bowing condition is usually caused by a loss of structural integrity where there is a loss of attachment of the support rods, along with a disintegration of the cement between the glass pieces and the lead caming. This loss of window integrity and cement disintegration can cause the weight of the glass panel to press downward and push the lower glass pieces and sections of the window outward from the flat plane of the original window to form a bulge or bow. Also such window deformation can be caused by sudden shock due to the window being hit or struck by a piece of furniture during the process of being moved. The bowing of old stained glass windows can be gradual. For example, a stained glass window in a door panel is affected each time the door is opened and closed. Due to the age of many stained glass windows installed in the late nineteenth century, a great many of these stained glass windows are now in need of repair.

A stained glass window which has become bowed or bulges outward or inward must eventually be repaired. It is common practice in the prior art to remove bowed stained glass windows from the wall or door where they are installed, and then to disassemble the glass pieces from their lead caming. The entire stained glass window is then rebuilt. The process of removing a stained glass window from its frame or wall can be difficult, time-consuming and costly. In some repair processes manual pressure and/or weight is applied to the bulge while the window is horizontally disposed on a workbench while heat is sometimes used to aid in flattening the bulge.

SUMMARY OF THE INVENTION

It is an object of this invention to provide a tool and method of repair that allows a worker to remove a bulge from a stained glass windows in situ so that the bowing or bulging of the glass can be attended to without the need for removing the stained glass window panel from its installed location. Repairing stained glass windows in situ saves the time and money that would be spent during such removal, disassembly and rebuilding of the stained glass window and reinstallation of the window. The attendant problems in having an opening in a building exposed to the outside environment is also avoided.

The tool and method of repair of this invention not only can be utilized to correct bowing without the need for removing the stained glass window, but also is useful even when the window has been removed to be repaired in a studio. Often, work space may be limited on a workbench or otherwise restricted, but the tool and method of repair of this invention can be utilized in a vertical position, rather than requiring that the stained glass window be placed on a horizontal workbench.

The tool and method of repair of this invention allow a worker to attend to the removing of a bulge in a stained glass window while it is left in place in its original location which procedure has significant commercial advantages, as discussed above. Even if the stained glass window has been removed, the tool and method of repair of this invention can also be used on a flat, horizontal work bench to help re-flatten the leaded glass piece panel as the only method currently available is a rather imprecise application of manual pressure with or without weights on the various bulges in hopes that they will return back to the original plane of the stained glass window. The tool and method of repair of this invention allows for an improved controlled and graduated pressure to be applied to any bulge, which pressure can be increased or decreased as determined by the worker to enable the individual pieces of the stained glass window to be repositioned back to their original position within the lead earning matrix. When used on bowed stained glass windows in situ, the tool of this invention can be used either from the inside or from the outside of the window, depending on the structural limitations of the building or structure that may house the window. Usually one person is sufficient to operate the tool and perform the method of repair of this invention. It is also envisioned that the tool can be provided with longer or shorter members, as described below, to meet the requirements of various stained glass window sizes and types of bowing therein.

The tool provides for elongated adjustment slots, one at each end of two angle irons and one in the center of one that are described below, to allow for the exact alignment with small, ⅛ inch in diameter holes that are drilled into the lead earning matrix above and below, or in some instances to the sides of, the bulge and, in yet another embodiment, in the lead caming near the center of the bulge. Once such holes are drilled, first and second threaded rods can be inserted therethrough and the faces of two angle iron can be installed, against each side of the window, one in the back and one in the front. Tightening means, such as a pair of wing nuts and associated washers described below, are then threaded one on each end of the threaded rods and alternately rotated inward to slowly bring the two angle irons together to force the bulge in the stained glass window back into the window's original plane between the faces of the two angle irons or between a single angle iron and a round clamp plate. One can, in some embodiments of the tool and method of repair of this invention, use shims to increase the range of surface pressure of the tool on the bulge and to further assure a seamless return of the stained glass pieces to their original flat plane such that the misaligned portions of the stained glass window are realigned in such plane. Shims are advantageous to use in that they can disperse the pressure on the bulge over a wider area of the window rather than just in the area immediately under the width of the face of the angle iron or clamp plate, thereby reducing the risk of damage to the stained glass window. Special care must be taken as some stained glass windows can be considered irreplaceable works of art or are valuable antique windows.

It should be noted that although in this application reference is made to lead earning, the same tool and method of repair can be utilized on stained glass windows having earning of copper foil, zinc, and other metals. Thus the use of the term "lead caming" is considered here to encompass the use of other materials utilized to retain the stained glass pieces within the stained glass window.

DESCRIPTION OF THE PREFERRED EMBODIMENT(S)

Figure 1:
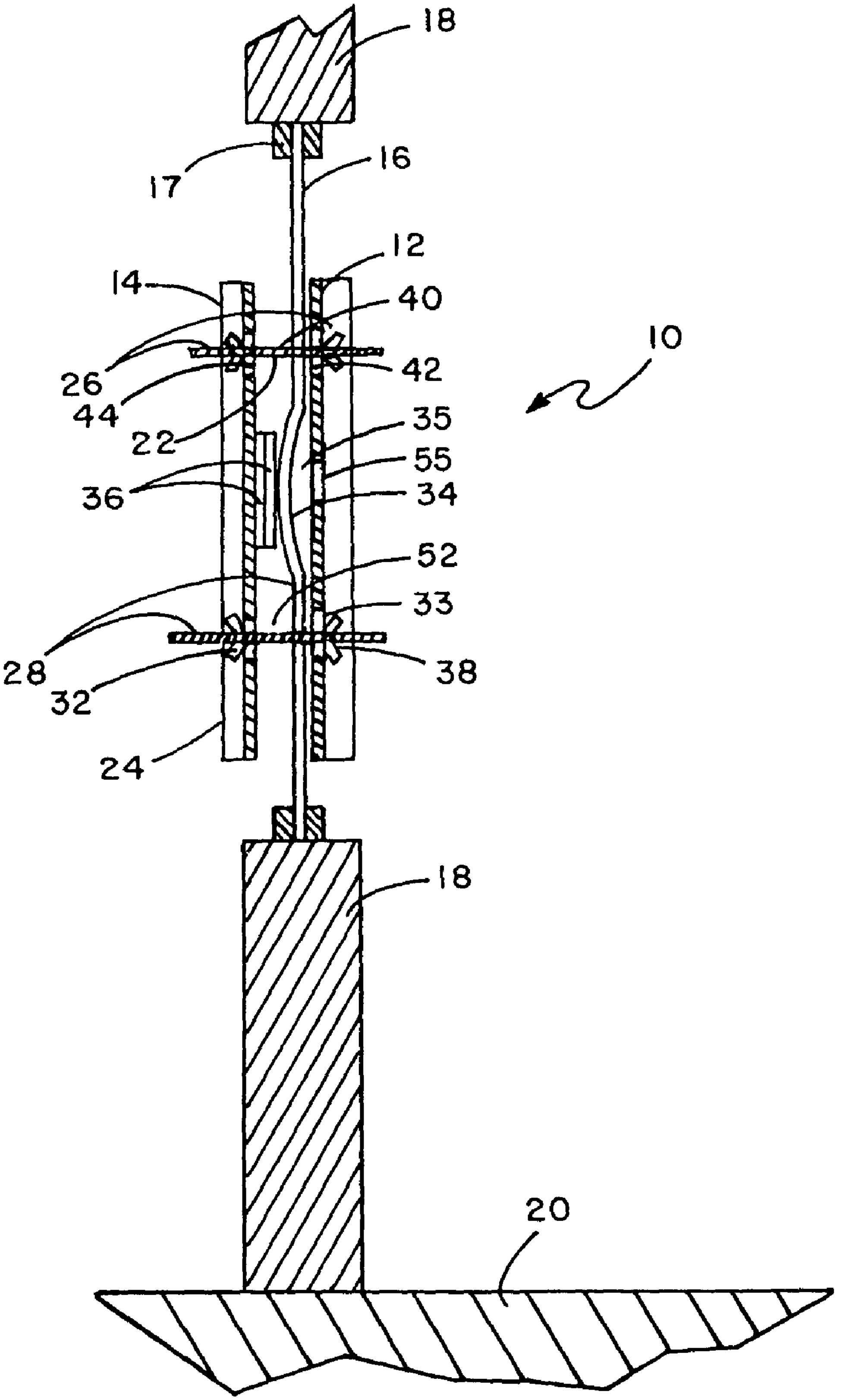
FIG. 1 illustrates a side view of the tool of this invention installed on a stained glass window to correct a bulge within such window.
Figure 2:
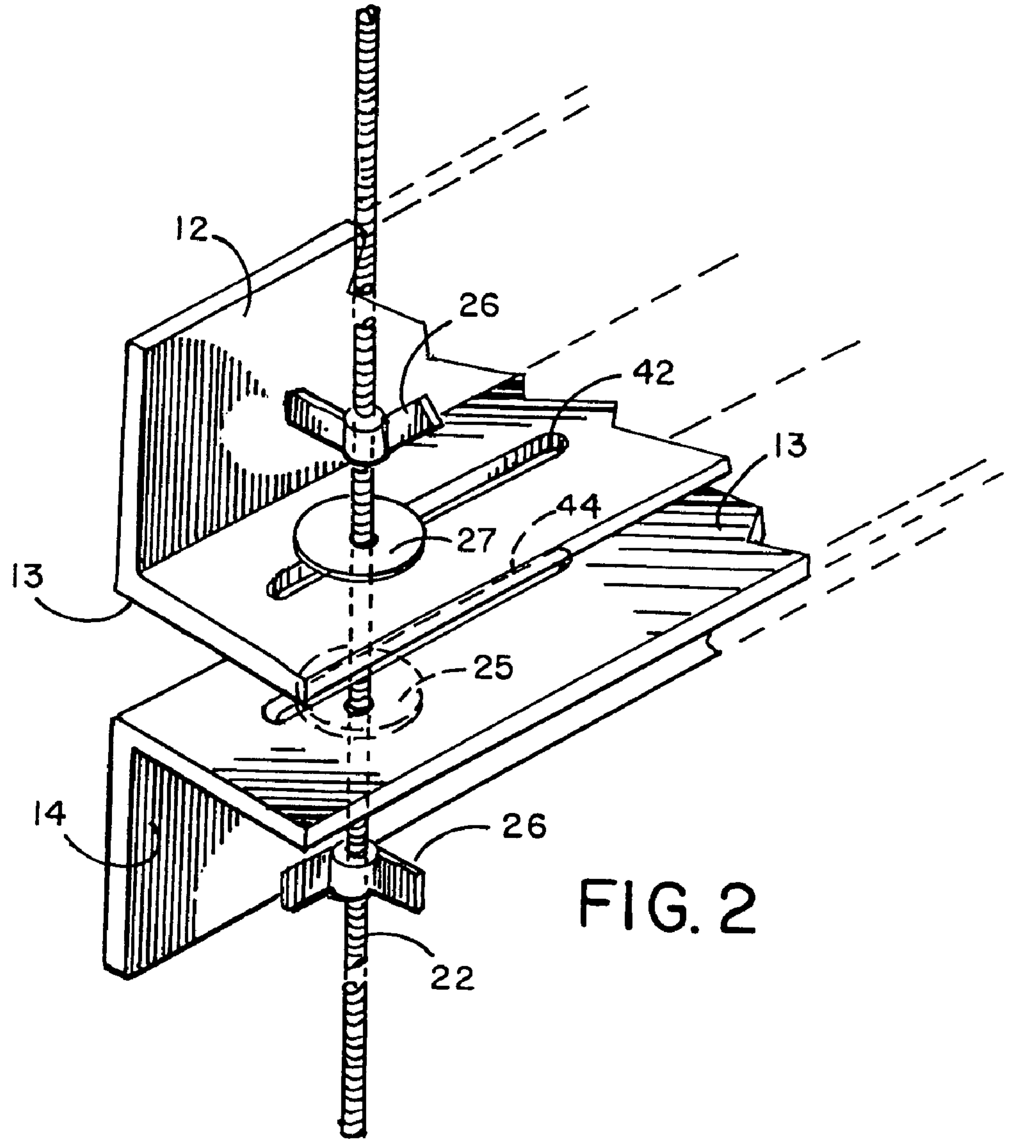
FIG. 2 illustrates an enlarged sectional perspective view of one end of the tool of this invention illustrated without a stained glass window positioned between the first and second angle irons.

FIG. 1 illustrates stained glass window 16 held within frame 17 within wall 18 where the window is positioned vertically to floor 20. Tool 10 of this invention allows a worker to repair a bulge in a stained glass window while it is in situ without the need for removing the stained glass window from the wall and taking it to another location for disassembly and repair. In utilizing the tool and method of repair of this invention, the worker first drills a first aperture 40 of approximately ⅛ inch in diameter in the leaded caming above the bulge and a second aperture 38 of approximately ⅛ inch in diameter in the leaded caming at a position below bulge 34 of the stained glass window, such first and second apertures located beyond the edges of bulge 34. Area 35 depicts space in back of bow in the window. After first and second apertures 40 and 38 have been drilled, tool 10 of this invention can then be installed, either aligned vertically as shown in FIG. 1, or placed on the window at any angle best suited for removing the bulge in the stained glass window. First and second threaded rods 22 and 24 are then passed, respectively, through first and second apertures 40 and 38 that have been drilled in the lead caming of the window. First and second angle irons 12 and 14 are then positioned, one in front and one in back of the window, and first and second threaded rods 22 and 24 are passed, respectively, through first and second elongated slots formed, respectively, at the ends of first and second angle irons 12 and 14. First and second threaded rods 22 and 24 must be of a length to span the combined thickness of the bulge, the thickness of the window pane in its original position and the thickness of first and second elongated member, such as first and second angle irons 12 and 14. Although angle irons are illustrated herein, it should be noted that other equivalent types of elongated, flat members can also be used in the tool and method of repair of this invention. Tightening means, such as first and second pairs of wing nuts 26 and 28 and their associated pairs of first and second washers 27 and 25 seen in FIG. 2, are then threaded, respectively, onto the ends of first and second threaded rods 22 and 24; and such wing nuts are slowly rotated inward on each side of the window to pull first and second angle irons 12 and 14 together, sandwiching and compressing bulge 34 in the stained glass window. It should be noted that equivalent tightening means can be threaded onto the threaded rods in place of the wing nuts and associated washers as long as they act to move the elongated members, such as first and second angle irons 12 and 14, together. In some instances shim(s) 36, as seen in FIG. 1, which can be made of plywood or equivalent material, can be used to help spread pressure outwards laterally on the glass from face 13 of the angle iron, if needed. As one gradually tightens first and second pairs of wing nuts 26 and 28 on first and second threaded rods 22 and 24, respectively, first and second angle irons 12 and 14 are pulled together to a point where space 35 space therebetween is only as thick as the window pane itself which action compresses bulge 34 in the window back into alignment with the original plane of the stained glass window. At the end of the process the tool illustrated in FIG. 1 is removed, and the first and second apertures in the metal caming are filled. One can then apply cement between the lead caming and glass to help hold the stained glass pieces of the straightened bulge in position once bulge 34 in the window has been realigned with the rest of the window pane.

FIG. 2 illustrates an enlarged perspective view of the upper ends of first and second angle irons 12 and 14 shown in FIG. 1 where face 13 of each angle iron is to be positioned, respectively, against a stained glass window which is omitted in this drawing for purposes of illustration. Threaded rod 22 is seen with first pair of wing nuts 26 threaded on from each side thereof which can have their associated first and second pairs of washers 27 and 25, respectively, disposed between them and first and second elongated slots 42 and 44, respectively, in first and second angle irons 12 and 14. First and second elongated slots 42 and 44 provide openings to align first and second apertures 40 and 38 through which first and second threaded rods 22 and 24, respectively, pass.

Figure 3:
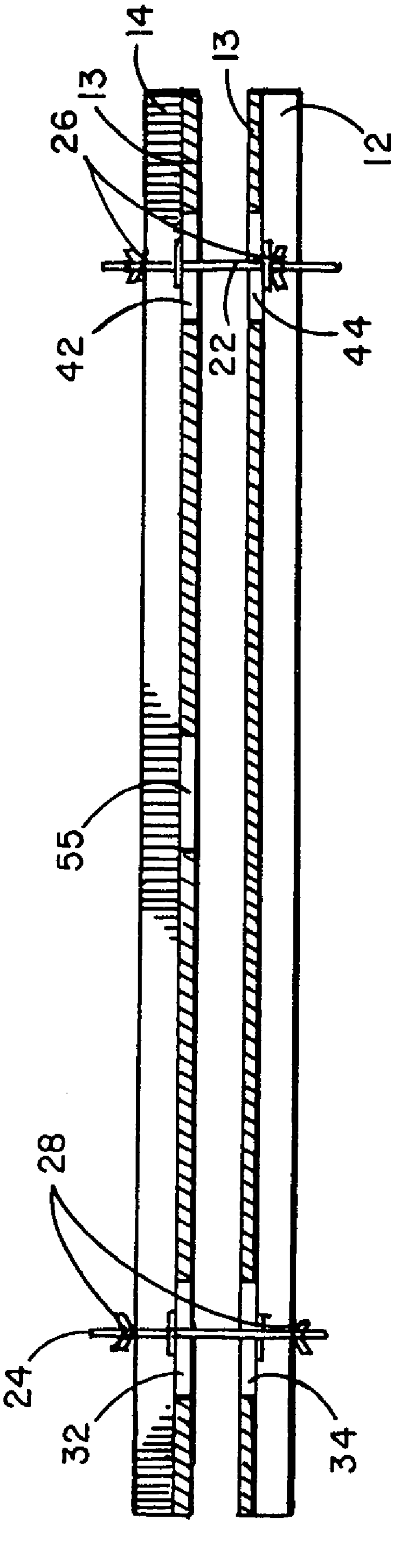
FIG. 3 illustrates the tool of this invention, showing its two angle irons and two threaded rods inserted in the elongated slots with tightening means disposed on the threaded rods.

FIG. 3 illustrates a side view of the tool of this invention, showing first and second upper elongated slots 42 and 44 through which first threaded rod 22 is positioned, slot 55, and also showing first and second elongated lower slots 30 and 32 through which second threaded rod 24 is positioned with their respective pairs of first and second wing nuts 26 and 28 which can be tightened, pulling the angle rods together to cover a bulge in a stained glass window, not shown for purposes of illustration.

Figure 4:
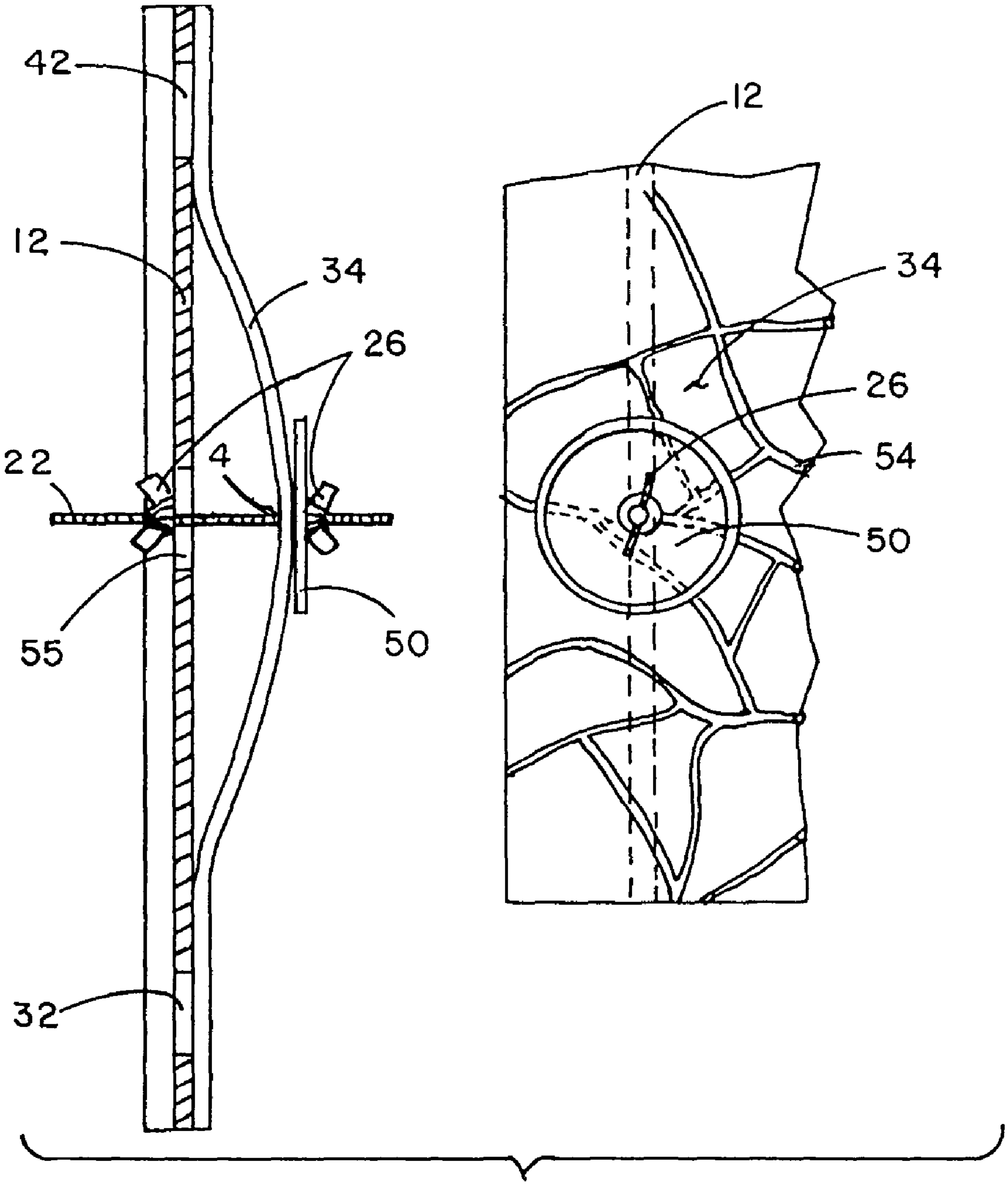
FIG. 4 illustrates a side view and an enlarged top view of an alternate embodiment of the tool and method of repair of this invention, showing a threaded rod used with a round clamp plate and angle iron for repairing a small deformation in a stained glass window.

FIG. 4 illustrates a side view and an enlarged top view of an alternate embodiment of the tool and method of repair of this invention, showing threaded rod 22 used with a round clamp plate 50 for repairing a deformation in a stained glass window. Lead earning 54 is best illustrated in FIG. 4. In this embodiment only one angle iron 12 is used, and threaded rod 22 is placed through aperture 4 of approximately ⅛ inch in diameter in the lead earning at the center of bulge 34 and through round clamp plate 50 positioned on top of the bulge. When wing nuts 26 are tightened, they will pull bulge 34 back into alignment with the original plane of the window. This type of round clamp plate 50 is especially useful as it can be of various sizes. At the end of the repair process the tool illustrated in FIG. 4 is removed, and the aperture in the metal earning is filled.

Figure 5:
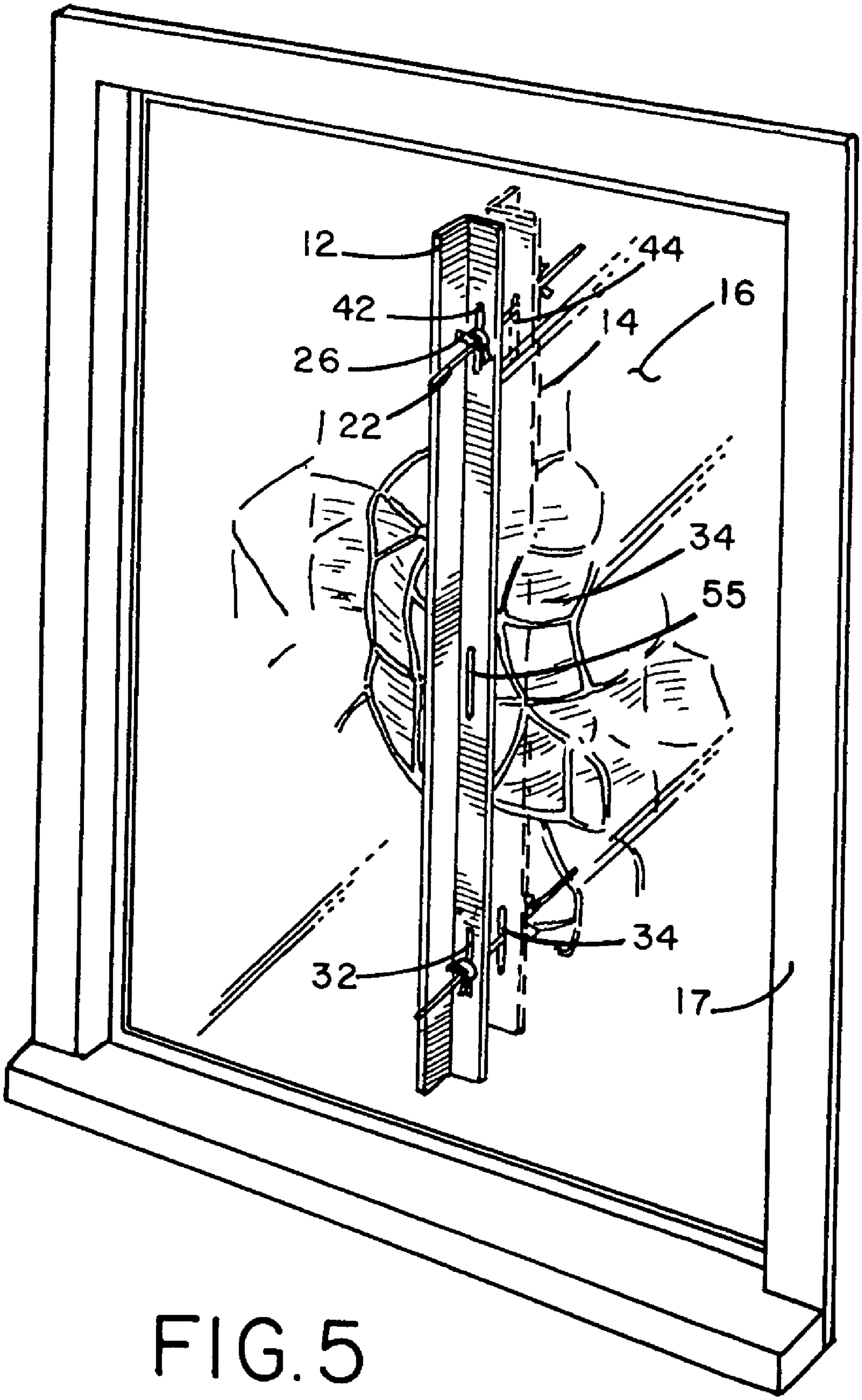
FIG. 5 illustrates the tool of this invention positioned in situ on a stained glass window to correct a bulge in the window without the need for removing the window to perform such work.

FIG. 5 illustrates a stained glass window in situ, showing first and second angle irons 12 and 14 positioned on stained glass window 16 over bulge 34. As the first and second pairs of wing nuts 26 and 28 are gradually tightened, first and second angle irons 12 and 14 come together, forcing bulge 34 back into alignment with the original plane of the window.

Although the present invention has been described with reference to particular embodiments, it will be apparent to those skilled in the art that variations and modifications can be substituted therefor without departing from the principles and spirit of the invention.

I claim:

1. A method for repairing a bulge in a stained glass window of the type having a plurality of glass pieces held in place by metal caming and cement, said stained glass window having an original glass plane and first and second planar sides disposed opposite to one another, said stained glass window having a thickness being the distance between said first and second planar sides of said original stained glass window, said bulge having sides and a thickness being the distance of the bulge away from said original glass plane, comprising the steps of:

forming first and second apertures in said metal caming in said original glass plane of said window, said first and second apertures passing through said first and second sides of said window, said first and second apertures disposed one on each side of said bulge;

providing first and second elongated members, each of said first and second elongated members having a flat face, first and second ends, a thickness and a width;

providing first and second elongated slots, respectively, at said first and second ends of said flat faces of said first and second elongated members;

positioning said flat faces of said first and second elongated members, respectively, opposite one another on said first and second sides of said stained glass window with said flat faces facing one another;

providing elongated first and second threaded rods, each of said first and second threaded rods having a length longer than the combined thickness of said bulge, said original stained glass window; and said first and second elongated members;

passing said elongated first and second threaded rods, respectively, through said first and second apertures;

passing said first and second ends of said elongated first and second threaded rods, respectively, through said first and second elongated slots defined in said first and second elongated members;

providing two pairs of first and second tightening means having threading therein;

threading one pair of said first and second tightening means, respectively, on each of said first and second ends of said elongated first and second threaded rods;

tightening one pair of said two pairs of first and second tightening means;

tightening said other pair of said first and second tightening means;

pulling said first and second elongated members toward one another while maintaining said first elongated member adjacent to said plane of said original stained glass window;

continuing to alternate said steps of tightening each of said pairs of first and second tightening means to force said second elongated member against said bulge;

compressing said glass pieces of said bulge into alignment with said original plane of said stained glass window;

removing said tool from said stained glass window;

cementing said metal caming to said realigned glass pieces now disposed in said original glass plane of said stained glass window; and filling in said first and second apertures in said metal earning.

2. The method of claim 1 further including the step of:

providing at least one shim having a width wider than said width of said second elongated member, said shim disposed between said second elongated member and said bulge for spreading the area of compression over said bulge beyond said width of said second elongated member alone.

3. A method for repairing a bulge in a stained glass window of the type having a plurality of glass pieces held in place by metal caming and cement, said stained glass window having an original glass plane and first and second planar sides disposed opposite to one another, said stained glass window having a thickness being the distance between said first and second planar sides of said original stained glass window, said bulge having sides and a thickness being the distance of the bulge away from said original glass plane, comprising the steps of:

forming an aperture in said metal caming in said original plane of said stained glass window, said aperture passing through said first and second sides of said window, said aperture disposed in a central area of said bulge;

providing an elongated member having a flat face, first and second ends, a thickness and a width;

providing an aperture in a central area of said flat face of said elongated member;

positioning said flat face of said elongated member on a portion of said window having a flat plane;

providing a round clamp plate having a thickness and having an aperture defined therein;

positioning said round clamp plate on top of said bulge;

providing an elongated threaded rod having first and second ends and having a length longer than the combined thickness of said bulge, said original stained glass window; said elongated member, and said round clamp plate;

passing said elongated threaded rod, respectively, through said aperture in said round clamp plate, said aperture in said bulge, and said aperture in said elongated member;

providing a pair of first and second tightening means having threading therein;

threading said pair of said first and second tightening means, respectively, at said first and second ends of said elongated threaded rod;

tightening said pair of first and second tightening means;

pulling said elongated member and round clamp plate toward one another while maintaining said elongated member adjacent to said plane of said original stained glass window;

compressing said glass pieces of said bulge into alignment with said original plane of said stained glass window;

removing said tool from said stained glass window;

cementing said metal earning to said realigned glass pieces now disposed in said original plane of said stained glass window; and filling in said aperture in said metal earning.

4. A tool for straightening a bulge in a stained glass window of the type having a plurality of glass pieces held in place by metal earning and cement, said stained glass window having an original glass plane and first and second planar sides disposed opposite to one another, said stained glass window having a thickness being the distance between said first and second planar sides of said original stained glass window, said bulge having sides, a thickness being the distance of the bulge away from said original glass plane, comprising:

first and second elongated members, each having a flat face for positioning said faces, one on each side of said stained glass window, said first elongated member positioned adjacent to said bulge, said second elongated member positioned adjacent to said original plane of said window, each of said first and second elongated members having, respectively, first and second ends;

first and second elongated slots defined, respectively, in said first and second elongated members at said first and second ends thereof;

first and second apertures defined in said metal caming, said first and second apertures located beyond said sides of said bulge;

first and second threaded rods for positioning, respectively, through said first and second apertures defined, respectively, in said metal caming in said original glass plane of said stained glass window, said first and second apertures located beyond said bulge wherein said first and second ends of said first and second threaded rods are passed through said elongated slots, respectively, of said first and second elongated members; and two pairs of first and second tightening means having threading therein, said first and second pair of tightening means for threading on opposite sides, respectively, at said first and second ends of said first and second threaded rods for tightening said first and second threaded rods and forcing said bulge out of said stained glass window by said first and second elongated members being moved toward one another and causing said bulge to be in alignment with said original plane of said stained glass window.

5. A tool for straightening a bulge in a stained glass window of the type having a plurality of glass pieces held in place by metal caming and cement, said stained glass window having an original glass plane and first and second planar sides disposed opposite to one another, said stained glass window having a thickness being the distance between said first and second planar sides of said original stained glass window, said bulge having sides, a central area having metal caming, a thickness being the distance of the bulge away from said original glass plane, comprising:

an elongated member having a central area defined therein, said elongated member for positioning on said first planar side of said stained glass window in alignment with said plane of said original stained glass window, said elongated member having an aperture defined in said central area;

a clamp plate having a central area, said clamp plate having an aperture defined in said central area;

an aperture defined in said metal caming in said central area of said bulge;

a threaded rod having first and second ends, said threaded rod for positioning through said apertures defined, respectively, in said clamp plate, said metal caming in said central area of said bulge, and said aperture defined in said central area of said elongated member; and a pair of tightening means having threading therein, said tightening means for threading, respectively, on said first and second ends of said threaded rod for tightening and forcing said elongated member and clamp plate to be moved toward each other, thereby forcing said bulge out of said stained glass window to be in alignment with the plane of said original stained glass window for re-cementing said realigned stained glass pieces to said metal caming.

* * * * *